United States Patent [19]

Range et al.

[11] Patent Number: 5,173,225
[45] Date of Patent: Dec. 22, 1992

[54] METHOD FOR MAKING ULTRA-THIN DENSE SKIN MEMBRANE

[75] Inventors: Franklin W. Range; N. Lee Wolfe, both of Athens, Ga.

[73] Assignee: Bowolfe, Inc., Watkinsville, Ga.

[21] Appl. No.: 520,050

[22] Filed: May 7, 1990

[51] Int. Cl.⁵ .................................................. B29C 67/20
[52] U.S. Cl. ................................... 264/45.5; 264/215; 264/216
[58] Field of Search .............. 264/41, 215, 216, 212, 264/45.5; 210/490

[56] References Cited

U.S. PATENT DOCUMENTS

| | | | |
|---|---|---|---|
| 2,240,101 | 4/1941 | Smith | 23/292 |
| 2,999,845 | 9/1961 | Goldberg | 260/47 |
| 3,189,662 | 6/1965 | Vaughn, Jr. | 260/824 |
| 3,445,321 | 5/1969 | Groves | 161/92 |
| 3,575,170 | 4/1974 | Clark | 128/275 |
| 3,767,737 | 10/1974 | Lundstrom | 264/216 |
| 3,822,202 | 7/1974 | Hoehn | 210/2.3 |
| 3,892,665 | 7/1975 | Steigelmann et al. | 210/490 |
| 3,969,548 | 7/1976 | Hunter et al. | 427/244 |
| 4,086,310 | 4/1978 | Bottenbruch et al. | 264/41 |
| 4,134,742 | 1/1979 | Schell | 55/16 |
| 4,243,701 | 1/1981 | Riley et al. | 264/41 |
| 4,346,126 | 8/1982 | Kutowy et al. | 427/209 |
| 4,410,630 | 10/1983 | Zierdt | 435/284 |
| 4,416,984 | 11/1983 | Wheeler, Jr. | 435/31 |
| 4,444,663 | 4/1984 | Aoyagi et al. | 264/49 |
| 4,445,884 | 5/1984 | Kurtz et al. | 604/4 |
| 4,459,139 | 7/1984 | von Reis | 55/189 |
| 4,613,440 | 9/1986 | Zupancic et al. | 210/490 |
| 4,666,668 | 5/1987 | Lidorenko et al. | 210/510.1 |
| 4,774,038 | 9/1988 | Ditter et al. | 264/41 |
| 4,818,258 | 4/1989 | Vann, III | 55/158 |
| 4,883,716 | 11/1989 | Effenberger et al. | 264/215 |

FOREIGN PATENT DOCUMENTS

0337677 10/1989 European Pat. Off. .
2214498A 3/1988 United Kingdom .

Primary Examiner—Leo B. Tentoni
Attorney, Agent, or Firm—Kilpatrick & Cody

[57] ABSTRACT

A ultra-thin dense skin gas-controlling membrane that is impermeable to liquids, bacteria, and viruses, yet is permeable to small molecular weight gases, such as $O_2$, $CO_2$, $NH_3$, $N_2$, and water vapor, and a method for making the membrane. The membrane possesses specific gas transfer characteristic making it suitable for use in the culturing of biological materials. The membrane is incorporated into cell culture apparatus, such as roller bottle caps, for the benefit of optimally maintaining $O_2$ and $CO_2$ levels in the tissue culture container during all phases of cell growth. The membrane also acts as an absolute barrier to microbial contamination of the culture media within the culture container.

8 Claims, 4 Drawing Sheets

METHOD FOR MAKING ULTRA-THIN DENSE SKIN MEMBRANE

BACKGROUND OF THE INVENTION

This invention relates to a method of making ultra-thin dense skin gas-controlling asymmetrical membranes and compositions containing ultra-thin dense skin gas-controlling asymmetrical membranes.

The growth and culturing of biological material such as cells, tissues, and organs is essential to the scientific and health care fields. World wide demand for products employing mammalian tissue cultures is increasing rapidly as new advances are made in diagnostic procedures and therapeutic treatments. However, current large-scale cell production methods are not economical or reproducible enough to efficiently meet this demand.

Culturing and maintenance of biological materials is a complex science requiring precise balancing of such environmental parameters as nutrients, growth factors, temperature, pH, and the partial pressures of respiratory gases. In addition, it is important to guard against contamination of the culture by bacteria, fungi, their spores, yeast, and viruses. In the past 50 years, a great deal of cell culture research has been conducted on the effect of different media compositions on cell growth and viability. However, research on basic environmental requirements has remained virtually unchanged. Updating culture techniques is a necessary complement to recent advances in cell biology and culture media refinement.

Large scale tissue culture is traditionally carried out in capped roller bottles using bicarbonate buffer systems. The maintenance of adequate oxygen and carbon dioxide levels is a basic requirement for culturing cells in vitro. Appropriate gas exchange is, therefore, of primary concern in tissue culture methodology. Generally, commercial scale roller bottle cell culture is performed in large, heated rooms (approximately 37° C.), in which it is not practical to maintain high $CO_2$ levels. A typical roller bottle has a volume of approximately one to two liters (490 to 1080 $cm^2$ surface area), and contains 100 to 300 ml of growth media. It is housed on a roller bottle rack at a 5° incline and rotated at 1-2 revolutions per minute. To obtain the appropriate $CO_2$ levels, the growth medium is saturated with $CO_2$ prior to capping the bottles. Dissolved $CO_2$ from the media diffuses into the bottle atmosphere until equilibrium is reached. This arrangement provides adequate $CO_2$ partial pressure and proper buffer pH for all phases of cell growth.

As the cells multiply and begin to respire, the concentration of $CO_2$ in the media and in the atmosphere within the roller bottle begins to rise, causing the media pH to decrease. If the roller bottle remains tightly capped, the pH decreases below the optimum level, and adversely affects the cells. Consequently, roller bottle caps must be partially unscrewed to permit the reduction of the partial pressure of carbon dioxide. Failure to loosen the roller bottle cap causes an increase of the partial pressure of carbon dioxide in the culture environment, which results in suboptimal cell growth or cell death.

Alternatively, if the bottle is completely uncapped or too loosely capped, the dissolved $CO_2$ in the media will quickly escape and the pH will increase above the optimal level. Such a rise in pH also has a detrimental affect on the cells. Additionally, caps that are too loose permit airborne microbes to enter the roller bottle or media to leak into the threads of the cap, thereby contaminating the culture and destroying its utility.

For example, Mycoplasma contamination constitutes a hazard to cell cultures in terms of the interpretation of data derived from contaminated cells. Mycoplasmas interfere with the growth rate of cultured cells, inhibit or stimulate lymphocyte transformation, induce chromosomal aberrations and alter host cell metabolism and ribosomal RNA and enzyme activities. Stanbridge, E. J. and Doersen, C., in *Mycoplasma Infection of Cell Cultures*. eds. G. J. McGarrity, D. G. Murphy and W. W. Nichols. 119-212 (Plenum Press. New York, 1978). Control of Mycoplasma contamination is especially important to successful clinical use of cell culture.

Cells are grown in tissue culture flasks in incubators heated to 37° C. with a 5 to 10% $CO_2$ atmosphere. The covering on the flask permits the equilibration of the media with the incubator environment.

Use of ultra-thin dense skin gas-controlling membrane caps on tissue culture flasks and roller bottles would aid in contamination control and greatly reduce or even eliminate the need for antibiotics in the culture media. This benefit would be especially significant when growing cells for therapeutic purposes. Cultures will not, for example, have penicillin present to elicit a reaction from people allergic to penicillin.

Suboptimal cellular growth caused by improper gas exchange and loss of cultures through cellular death or contamination is costly to the scientific, biomedical, and biotechnical communities in both time and materials. Improvements in cell and tissue culture technology that insure proper respiratory gas exchange and decrease the incidence of culture contamination would increase cell culture efficiency and reduce the costs of these valuable diagnostic and therapeutic materials.

In addition, improvements in the control of the partial pressures of respiratory gases would increase reproducibility and enhance growth rates and yields of in vitro cell cultures by optimizing the $CO_2$ and $O_2$ partial pressures in tissue culture containers, maximizing cell growth throughout the growth cycle of the cells and increasing cell growth rates and product yields.

It is therefore an object of the present invention to provide a membrane capable of limiting the exchange of small kinetic diameter gases in cell and tissue culture applications.

It is another object of the present invention to provide a membrane capable of acting as a microbial barrier to bacteria, fungi, their spores, yeast, and viruses.

It is yet another object of the present invention to provide a membrane that is of sufficient strength for use in tissue culture applications, that can be handled and sterilized using standard techniques.

It is a still further object of the present invention to provide caps or covers for culture containers incorporating membranes useful for culturing cells and tissues.

SUMMARY OF THE INVENTION

Membranes that control the partial pressures of respiratory gases and simultaneously block the passage of microorganisms consist of ultra-thin dense skin polymeric membranes that are permeable to small kinetic diameter gases (e.g. $O_2$, $CO_2$, $NH_3$, and $N_2$), but impermeable to bacteria, fungi, their spores, yeast, or viruses. The ultra-thin dense skin semipermeable membrane is produced by immersing a porous support substrate into a solution of a dissolved polymer. The polymeric material must be sufficiently hydrophobic to prevent absorption of media. Suitable polymers include the linear and cross-linked polydimethylsiloxanes, including polydimethylsiloxanes wherein phenyl, vinyl, trifluropropyl, silanol or hydrogen etc. is substituted for methyl. Other useful polymers include polydimethylsiloxane bisphenol A polycarbonate block copolymers, polydimethylsiloxane polysulfone block co-polymers, and poly [1-(trimethylsilyl)-1-propyne] and their mixtures. These polymers include any substituted polydimethylsiloxanes and any combinations thereof. The substrate, saturated with the polymer solution containing a solvent(s) that is immiscible with water, is subsequently floated across the surface of a water bath. Concurrently, volatile polymer solvent evaporates, causing the dissolved polymer to coalesce, forming a uniform ultra-thin dense skin membrane. The residual solvent in the membrane is subsequently removed by drying.

In the preferred embodiment, the ultra-thin dense skin membrane is sealably attached to a tissue culture flask or roller bottle cap containing a hole or opening. The ultra-thin dense skin gas-controlling membrane completely covers the hole or opening. Unlike traditional flask or roller bottle caps, a membrane-containing roller bottle cap permits the exchange of respiratory gases even when securely screwed or affixed to the tissue culture roller bottle or flask.

BRIEF DESCRIPTION OF THE DRAWINGS

FIG. 5 are graphs of the quantification of PX63-AG8.653 cells by Trypan blue dye exclusion. The histogram bars represent an average of two cell counts per flask, five flasks per group, and the standard deviation is indicated by the line extending above the bars. The cells were cultured using caps incorporating gas permeable ultra-thin dense skin membranes ([\\\]); loosened caps ([]); and caps screwed on tightly (■), and assayed at 24 h, 48 h, 72 h, and 96 h.

FIG. 6 are graphs of the growth of HT-29 human colon adenocarcinoma cells in T75 flasks.

DETAILED DESCRIPTION OF THE INVENTION

The polymeric material must be highly permeable to small kinetic diameter gases and be sufficiently hydrophobic to prevent absorption of media. Suitable polymers include the unlinked and cross-linked polydimethylsiloxanes, including polydimethylsiloxanes wherein phenyl, vinyl, trifluropropyl, silanol or hydrogen etc. is substituted for methyl. Other useful polymers include block co-polymers such as poly(dimethylsiloxane-co-bisphenol A polycarbonate), polydimethylsiloxane polysulfone block co-polymers, and poly [1-(trimethylsilyl)-1-propyne], copolymers and blends thereof. These polymers include any substituted polydimethylsiloxanes and any combinations thereof. These polymers are known and commercially available. Examples of these polymers and methods for synthesis thereof are described in U.S. Pat. Nos. 2,999,845 and 3,189,662.

The polymers are dissolved in a solvent such as dichloromethane. Various solvents, or mixtures of solvents, may be substituted for dichloromethane as long as the solvent, or at least one component of the solvent which solubilizes the polymer, is immiscible in water, and volatile so that the solvent evaporates from the polymer-solvent solution when exposed to air. These include low molecular weight halogenated hydrocarbons (for example, halogenated methanes such as methylene chloride, chloroform, carbon tetrachloride, and halogenated ethanes), tetrachloroethylene, hexachlorethane, polyhalogenated propanes and hydrocarbons and others having densities greater than one. The thickness of the resulting membrane is determined by the concentration of the polymer in the solvent, in combination with the substrate. The membrane cannot be made in multiple layers. As used herein, the thickness of the finished membrane refers to the overall thickness of the membrane including the substrate, unless otherwise specified. The polymeric membrane in combination with substrate ranges in overall thickness from approximately 0.002 cm to approximately 0.060 cm.

The membranes may be supported by a wide variety of substrates. They must be porous and the pore diameter must be small enough for the membrane to span the opening without breaking, preferably less than one mm. Preferably, the substrate must be flexible enough to pass through the membrane making machine and be available in sheets or rolls. Substrates may be in the form of woven fabrics or wire screen, spunbonded nonwoven fabrics, felted fabrics, paper, extruded or cast polymer films, and sintered polymers. These materials can be natural, including plant fibers such as cellulose, cotton, and animal fibers. Synthetic materials include metal wire, fiberglass (woven and felted), and many of the synthetic polymers commercially available, such as polyesters, polyethylenes, polyolefins, polyamides, polycarbonates, polysulfones, polypropylenes, polyamides, polytetrafluoroethylene and others. The substrate materials are known and commercially available.

The substrate, saturated with polymer dissolved in a solvent or mixed solvent, at least one of which is immiscible with water, is subsequently floated across the surface of a water bath. Concurrently, volatile polymer solvent evaporates, causing the dissolved polymer to coalesce, forming a uniform membrane having an ultra-thin dense skin. The residual solvent in the membrane is subsequently removed by drying.

It is apparent to those skilled in the art that this method can be varied in order to modify the resulting membrane. For example, polymer-solvent solutions having a density of more than one may be employed and alternative means to prevent evaporation of the solvent from the polymer-solvent solution, other than water, can be used. In addition, means for forced air or heated air drying may be used to reduce the gelling and drying time of the final membrane.

These membranes can be used in any situation requiring membranes having similar gas-controlling properties. In the preferred embodiment, the membranes are placed within containers for cell culture having openings for gas exchange and secured to the container by means forming an air-tight, water tight seal. The preferred method for attaching the membrane is to heat seal one side of the membrane to the sides of the container (as used herein, container can refer to the sides, top, bottom, or covering for a container, which can be a conventional roller bottle or culture flask, or any other suitable apparatus for such purposes). However, other methods such as adhesives or mechanical restraints can also be used. The types of cells which can be grown in these apparatus are not limited but include any eucaryotic or procaryotic cells, such as mammalian cells, bacteria, viral cultures, and plant cultures.

The supported anisotropic composite membranes having ultra-thin dense skins described herein have high permeabilities to respiration gases that make it possible to construct cell culture containers permitting optimal gas exchange under sterile conditions, unlike either the containers or membranes of the prior art. The membranes having ultra-thin dense skins of the present invention are produced in a manner such that they possess very high gas transfer characteristics. The method for making these ultra-thin dense skin membranes is different from those used to make the prior art membranes. The substrate support material is first contacted with polymer solution under a layer of water and then the polymer solution saturated substrate is floated on a lower specific gravity liquid, preferably water, to form the membrane-substrate composite. The water covering drastically reduces the evaporation of the volatile solvent, thereby maintaining the polymer concentration ratio throughout the manufacturing process.

The resulting composite membrane having an ultra-thin dense skin consists of a substrate interspersed with polymer that is uniformly coated on both sides with membrane material. The finished membrane is anisotropic, as evidenced by the fact that on one side water disperses rapidly on the surface, indicating porosity, and beads up on the opposite side, indicating a dense uniform hydrophobic skin. There are several advantages derived from this configuration. Saturating the substrate with polymer solution prior to placing it on the water results in firm attachment of the membrane within the interstices of the support material. Since this membrane is within the support material, it is protected from abrasive damage when the product is run through cutting, slitting, rolling, punching or other machinery, or when it is handled by people fabricating membrane containing caps. This process results in a membrane that can be heat-sealed and handled without damage, but will not absorb culture media.

The membrane having an ultra-thin dense skin controls diffusion of small kinetic diameter gases across the membrane barrier, maintaining the proper partial pressures of these gases in the culture container necessary to support optimal cell growth. These composite membranes having ultra-thin dense skins composites allow exceptionally high $O_2$ and $CO_2$ transfer, thereby providing adequate $O_2$ for respiration during initial and exponential growth of the cells and adequate $CO_2$ exhaustion to maintain the media pH. The gas controlling ultra-thin dense skin membrane serves as an absolute physical barrier to microbial contamination, even the smallest virus. As used herein, the permeability of the membrane is defined by the permeability constant of the polymer membrane, in units of (ml gas, cm thickness) (sec, $cm^2$, $\Delta P$ cm Hg), which is related to the flux through thickness of the membrane and partial pressure difference. Common contaminating microorganisms of cell and tissue cultures such as spores, fungi, bacteria, mycoplasmas and viruses are excluded by the ultra-thin dense nature of the membrane.

Another feature of this membrane is that it possesses sufficient strength to withstand handling and sterilization. Since microbial contamination is a primary concern in culturing cells and tissues, it is imperative that ultra-thin dense skin membranes used for controlling respiratory gas exchange be of sufficient strength to maintain their integrity under physically stressful conditions such as handling and exposure to hydrostatic pressure. Yet another feature of this membrane is that it can be sterilized using standard methods, such as gamma irradiation and ethylene oxide.

The membrane is incorporated into a cap or cover for cell and tissue culture containers to regulate the flux of respiratory gases between the internal and external environments of the cell culture containers. Although described herein with reference to flasks and roller bottle caps, the membrane can be inserted into any type of cover or into the sides of any container such as tubes, petri dishes, and bioreactors, for the purpose of growing cells or other biological material where gas exchange is important. A benefit of a membrane-containing roller bottle cap is the elimination of the risk and incidence of contamination that is necessarily associated with solid roller bottle caps that must be left partially unscrewed. This in turn reduces the need for adding expensive antibiotics to cultures as is routinely done, resulting in cost and handling savings. Furthermore, cells to be used for human therapy may be grown in an antibiotic-free media, overcoming the problem of adverse patient reaction to those antibiotics.

Respiratory gas exchange occurs as the gases diffuse through the ultra-thin dense skin membrane. The rate of exchange is dependent upon the particular physical and chemical parameters (e.g. thickness of the membrane and type of polymer employed area and geomentry of the container) of the membrane. The use of roller bottle caps incorporating ultra-thin dense skin gas-controlling membranes provides respiratory gas exchange rates resulting in an optimal environment for initial and log phase growth of cells and tissues. Further, the use of membrane-containing caps eliminates the variability inherent in loosening solid roller bottle or flask caps, permitting more reproducible culture conditions and more consistent results. Similar benefits can be derived from incorporating the ultra-thin dense skin gas-controlling membrane directly into the side(s) of the culture vessel.

In a preferred embodiment, ultra-thin dense skin gas-controlling membranes made using poly(dimethylsiloxane-co-bisphenol A polycarbonate), referred to herein as "PDMS-co-pc", incorporated into a hotcalendered spunbonded polyester (Reemay by Dupont) are heat sealed into caps suitable for two liter cell culture roller bottles and tissue culture flasks. Membranes must withstand between four and six cm of water bursting strength for use in the roller bottles. These membranes are stronger than membranes bonded to the surface of a support material since the polymeric material is dispersed within the matrix of the support material. These membranes are permeable to water vapor and a barrier to the liquid. The membranes are heat sealed to the inside of the cap in the most preferred embodiment.

For use in cell culture applications, the membranes must be sterilizable by standard commercial techniques such as gamma irradiation and ethylene oxide treatment without suffering changes in their physical characteristics. Additionally, such membranes must be effective in blocking microbial contamination.

The present invention will be further understood with reference to the following examples demonstrating the preparation and application of these membranes in cell culture containers.

Example 1: Method of Making the Membranes.

Figure 1:
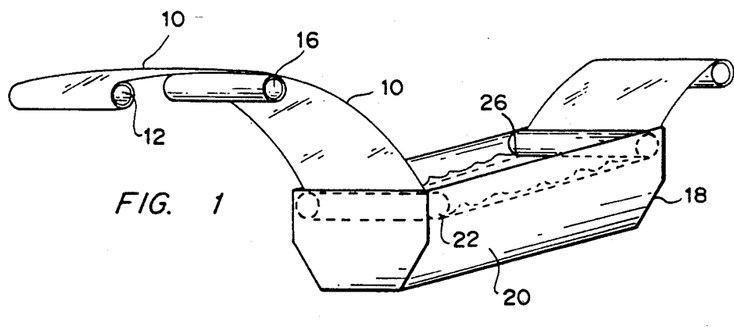
FIG. 1 is a prospective view of an apparatus for making gas-regulating membranes.

In the preferred embodiment, the ultra-thin dense skin gas-controlling membrane of the present invention is made according to the following method. Referring to FIG. 1, spun-bonded polyester substrate material 10 with a thickness of 0.03 cm is fed at a rate of 10 cm/min to 100 cm/min, preferably 10 to 60 cm/min, from a stock roll 12 to guide roller 14 by way of a tensioning roller 16 rotatably attached to polymer-solvent solution tray 18 wherein the spun-bonded polyester substrate is submerged in polymer-solvent solution 20 containing from 0.005 to 0.20 (g/ml) PDMS-co-pc to dichloromethane solvent. The polymer-solvent solution has a density greater than 1.0 and is overlaid with water 22 to prevent evaporation. The polymer solution-saturated substrate 24 is floated on the surface of the water 22 where the polymer solution 20 uniformly spreads throughout the interstices of the substrate material 10 to form a polymer solution saturated substrate 26. Concurrently, as the polymer saturated substrate 26 moves across the tray 18, solvent from the polymer solution 20 evaporates, causing the polymeric material to coalesce and form an ultra-thin dense skin asymmetric membrane. It is important that essentially all of the solvent evaporate from the membrane before it is lifted off the water surface or the still soft membrane may collapse. The membrane-substrate composite is subsequently lifted out of the tray 18 and air dried.

Example 2: Testing of Membranes.

Pinhole and Burst Testing. The burst strength test is employed as an overall indication of membrane continuity, integrity, and strength. The pinhole and bursting strength tests are conducted simultaneously using a method similar to the American Society for Testing Material (ASTM) membrane bubble point test described in ASTM Standards, F316(86), *Standard Test Methods for Pore Size Characteristics of Membrane Filters by Bubble Point and Mean Flow Pore Test*. The test membranes are mounted in a filter flask holder and covered with a thin layer of water. Pressure is applied beneath the membranes with bubbles indicating the presence of pinholes. Membranes which do not bubble or burst at a pressure of 4 cm $H_2O$ are considered acceptable.

Gas Flux Test

Membranes must possess specific gas flux characteristics to optimally support growth and viability of cultured cells and tissues. In the case of tissue culture flasks, it is important that the flask atmosphere equilibrate with the $CO_2$ atmosphere of the incubator before the pH of the media changes. It must reach equilibrium at least as quickly as a loosely capped flask. Theoretical calculations and experimental measurements dictate that these membranes have a carbon dioxide rate constant of 0.1 to 0.8/h.

In the case of the roller bottle, it is essential that carbon dioxide respired by the growing cells be out gassed at a rate that maintains the optimal pH in the roller bottle media. It has been found that a first order oxygen rate coefficient of 0.1/hr is ideal. Oxygen is measured rather than $CO_2$ as a matter of convenience and the $CO_2$ rate coefficient is calculated from the known ratio of $CO_2$ to $O_2$ permeability of the membrane material. In the case of most polydimethylsiloxanes, the ratio is 6 to 1.

The first-order oxygen rate coefficient is determined in the following way. The membrane is attached to a 1 $cm^2$ hole in the top of a T-75 flask cap. An oxygen sensor is attached to the T-75 flask. The flask is flushed with $N_2$ and then quickly capped with the test cap. As atmospheric $O_2$ diffuses back into the flask, the $O_2$ level inside the flask is plotted against time.

Figure 2:
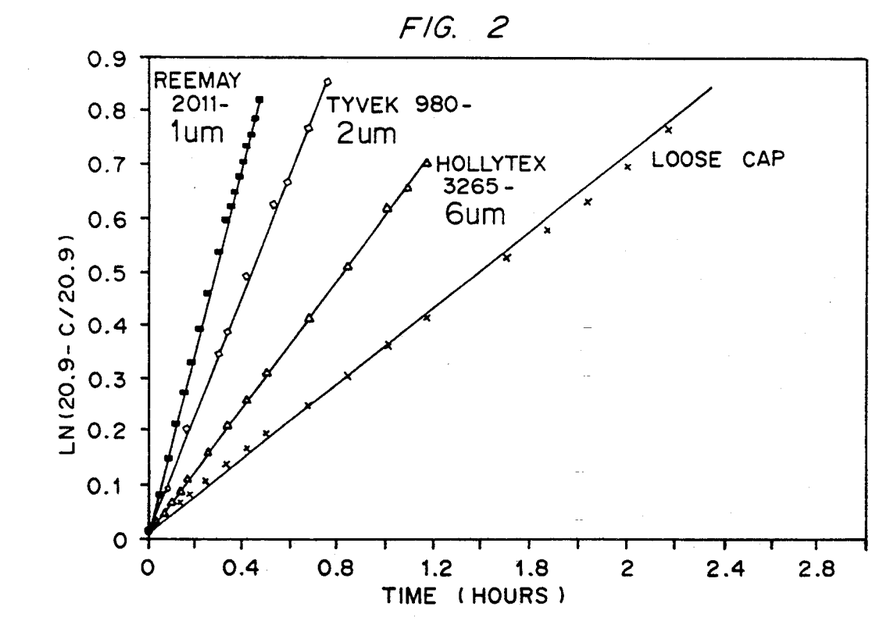
FIG. 2 is a graph of ln [(20.9-C) 20.9] versus time. The slope of this line gives the rate coefficients of oxygen exchange in T-75 flasks sealed with caps incorporating one of four composite membranes: Reemay 2011, 0.0014 cm thick (-■-■-■-); Tyvek 980, 0.009 cm thick (-◊-◊-◊-); Hollytex 3265, 0.0127 cm thick (-Δ-Δ-Δ-); and a loosely capped flask (-+-+-+-).
Figure 3:
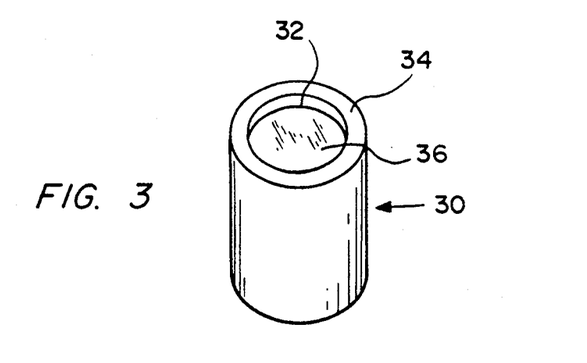
FIG. 3 is a prospective view of a roller bottle cap incorporating a gas permeable ultra-thin dense skin membrane.
Figure 4:
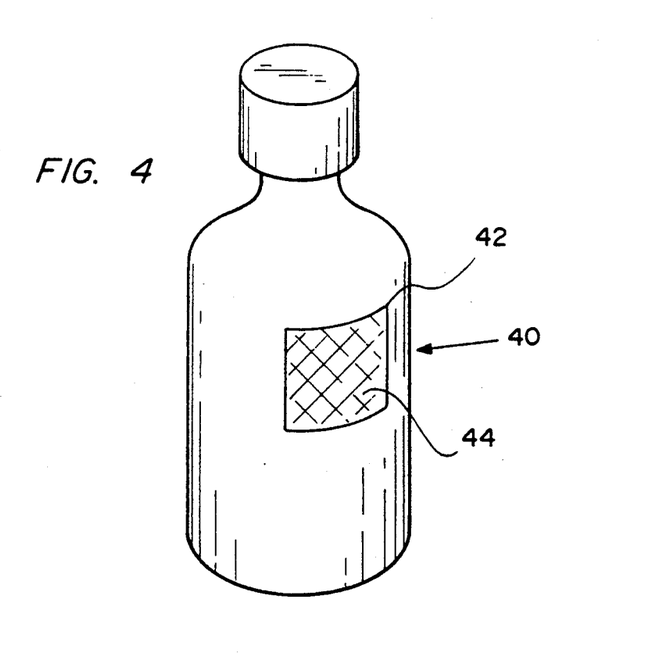
FIG. 4 is a prospective view of a roller bottle incorporating a gas permeable ultra-thin dense skin membrane into the bottle.

First-order rate coefficients are calculated from this data according to the following formula:

$$k = 1/t \ln[(20.9 - C)/20.9]$$

Where 20.9 = the atmospheric concentration of oxygen (%)
C = the concentration of oxygen in the flask (%)
t = time in hours This data is presented graphically in FIG. 2 for caps incorporating one of four different membranes and a standard loosely-capped control flask. The four membranes are the PDMS-co-pc incorporated into Reemay 2011 (0.0025 cm), Tyvek 980 (0.005 cm), and Hollytex 3265 (0.0127 cm) substrates. It can be seen from the slope of the lines that many of the test membranes achieve equilibrium with the incubator atmosphere faster than a loosely-capped flask.

Sterilization Test

Membrane samples were tested to determine whether the standard sterilization techniques of ethylene oxide (EtO) and gamma irradiation could be utilized without damaging the membrane. Ethylene oxide sterilization was carried out at the EtO facility at the College of Veterinary Medicine at the University of Georgia, Athens. Gamma irradiation was carried out by exposure to 2.82 mega rads by Isomedic, Inc. at their Spartanburg, S.C. location.

The results of the effect of sterilization on the first-order rate constants are summarized in Table 1. In each set, three samples of the PDMS-co-pc membrane on Hollytex 3265 (a non-woven polyester) were sterilized using the above two methods. There were three samples in each set. Based on the first-order rate constants for oxygen transfer, it is apparent that gamma radiation and ethylene oxide sterilization have no deleterious effect on the permeability and barrier integrity of the membrane to pathogens.

TABLE 1

Effect of sterilization on the integrity of the PDMS-co-pc membrane on Hollytex 3265 as indicated by their first-order rate constants (k/hr).

| k/hr[a] | gamma | EtO | Control |
|---|---|---|---|
| Set 1 | 4.7 ± 0.06 | 4.1 ± 0.3 | 5.5 ± 0.05 |
| Set 2 | 1.8 ± 0.03 | 3.2 ± 0.8 | 2.9 ± 0.2 |
| Set 3 | 2.5 ± 0.08 | 3.2 ± 0.2 | 3.8 ± 0.1 |

[a]The average value and SD for n = 3.

Microbial Contamination Test. A *Mycoplasma bovis* challenge was conducted on the membrane at the Veterinary Diagnostic and Investigational Laboratory in Tifton, Ga. The apparatus used was an osmotic test chamber which was partitioned in half by the test membrane. A 20 ml syringe with an 18 gauge needle was mounted in one of the top ports. The other ports were partially sealed with tape.

Figure 5A:
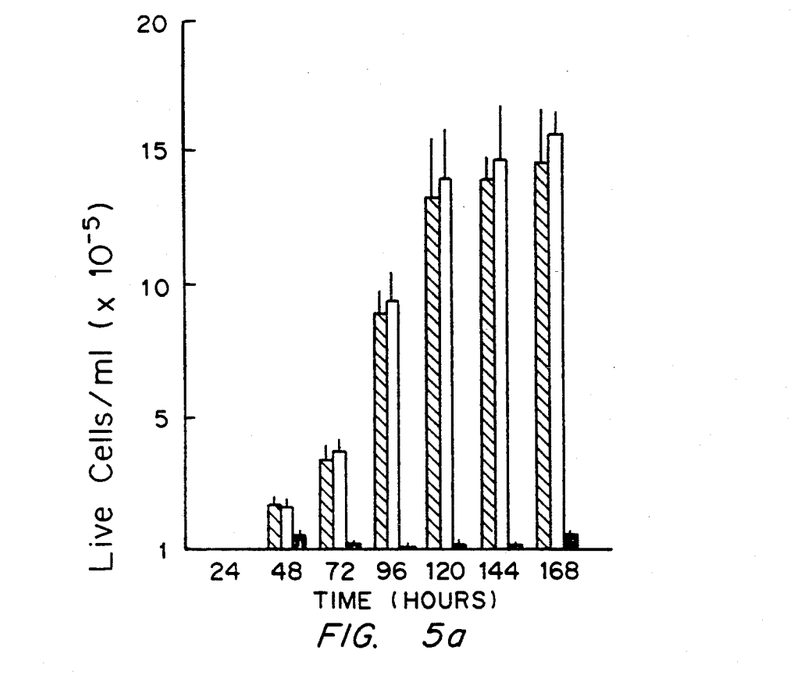
FIG. 5a is a graph of the number of live cells/ml ($\times 10^{-5}$) versus time in hours.
Figure 5B:
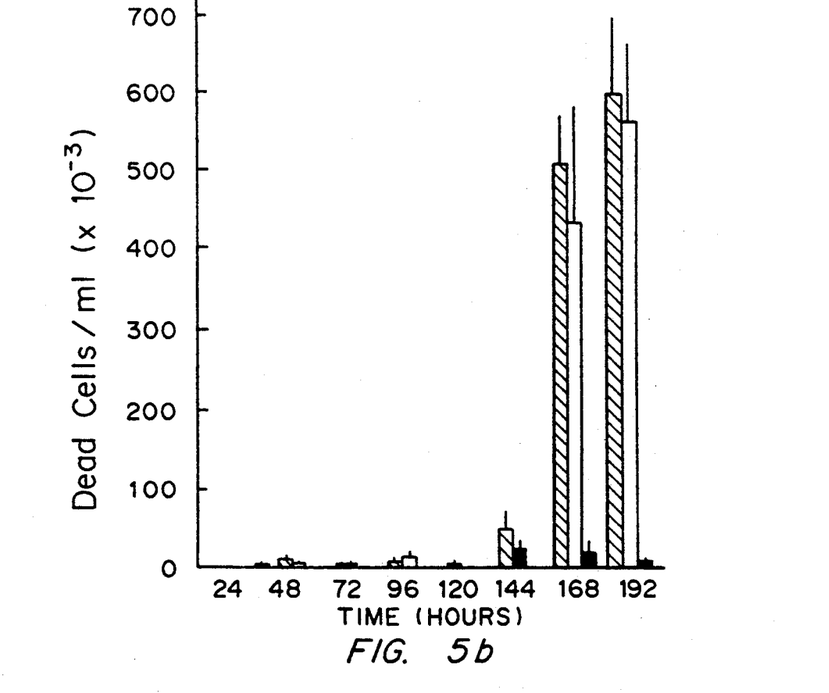
FIG. 5b is a graph of the number of dead cells/ml ($\times 10^{-3}$) versus time in hours.

*Mycoplasma bovis* culture was inoculated into mycoplasma broth and incubated at 37° C. under 10% $CO_2$ for five to seven days. Fifty (50) ml of inoculated broth containing Evans blue dye was inserted into the side of the cell with the syringe. The other side contained 15 ml of uninoculated broth. An additional 10 ml of inoculated broth was added to the syringe to increase the hydrostatic pressure differential across the membrane.

Two of the chambers were kept at room temperature and two were kept at 37° C., and observed for transfer of liquid and dye. After a minimum of 10 ml of fluid had transferred from the inoculated to the uninoculated side, samples were collected from both sides and tested for Mycoplasma. Test samples were incubated for five to seven days at 37° C. under 10% $CO_2$. Following the incubation period, the broth was subcultured into Mycoplasma agar, incubated as before and examined daily for evidence of Mycoplasma colonies (i.e., colonies with a "fried egg" appearance). These colonies, if present, were stained by the Dienes' stain for further examination.

A total of four tests were conducted. Significantly, no evidence of Mycoplasma was found on the down stream (uninoculated) side of the membrane. As expected, Mycoplasma was found in all samples taken from the (upstream) inoculated side of the membrane. The lack of contamination demonstrates that the membrane is an effective barrier to microbial contamination.

Using the same apparatus as the mycoplasma test, the membrane has been tested for the transference of a low molecular weight dye. Resazurin, a hydrophilic dye with a van der Waals radii of approximately 10 Anstroms, is an order of magnitude smaller than small viruses. Resazurin was placed in one side of the cell, and the other side examined for diffusion of the dye through the membrane. The lack of resazurin on the other side of the cell after five days demonstrates that the membrane is an effective barrier to viral contamination.

The roller bottle cap has also been tested as a barrier to bacterial contamination. *Bacillus subtilis* spores were atomized into a test chamber containing an open roller bottle, a tightly capped roller bottle, and a roller bottle containing a membrane cap. Turbidity, signifying bacterial growth, was only detected in the open container at the end of three days. This experimented demonstrated that the membrane cap is an effective barrier to bacterial contamination.

Example 2: Construction of Membrane Containing Roller Bottles and Caps

In the preferred embodiment, standard (solid) roller bottle caps are modified to incorporate ultra-thin dense skin gas-controlling membranes as follows. Referring to FIG. 3, a commercially available cap 30 fitting two liter roller bottles, obtained from Becton-Dickenson, Lincoln Park, NJ, is drilled to produce a 0.226 inch diameter hole 32 in the center of the top planar surface 34 of the cap. Ultra-thin dense skin gas-controlling membrane 36 is then sealably attached to the inner side of the top planar surface 34 of the cap to completely cover the hole.

In other embodiments, ultra-thin dense skin gas-controlling membrane material can be incorporated directly into the side of the culture container. Referring to FIG. 4, a flask or roller bottle 40 is formed or modified so as to have one or more openings 42 in one or more surfaces of the container wherein each and every opening is completely covered with membrane 46 sealably attached to either the inner or outer surface of the container. The openings can be of any shape, size or location as required by a particular situation.

Example 3: Suitability of Membrane Flask and Roller Bottle Caps for Tissue Culture Applications.

The suitability of membrane containing caps for use in growing suspension tissue cultures was tested using the following experimental procedure. PX63-Ag 8.653 (American Type Culture Collection, Rockville, Md.) mouse myleoma cells were grown in RPMI 1640 (Flow, McLean, Va.) supplemented with 10% fetal bovine serum (FBS, Hyclone, Logan, Utah), penicillin at 100 units per ml, amphotericin B at 2.5 μg per ml, and streptomycin at 100 μg per ml, containing a bicarbonate buffer system. The cells were cultured in an incubator (Queue, North Branch, N.J.) at 37° C. under 90% humidity and 5% $CO_2$. Cells were counted using a Bright-Line hemacytometer with Neubauer ruling, and cell viability was determined at each time point using the Trypan blue dye exclusion test. A 0.25% solution (filter sterilized) of Trypan blue (Eastman Kodak, Rochester, N.Y.) in phosphate buffered saline (PBS, 0.02M $NaPO_4$, 0.15M NaCl, pH 7.2) was prepared. Cells were mixed with Trypan blue and immediately counted using the hemacytometer. Both viable and nonviable cells were counted for each time point examined. Cells which stained blue were nonviable.

Three experimental groups consisting of five flasks each were prepared and inoculated at time 0 with $2\times10^6$ cells in 20 ml RPMI 1640 media. Group 1 had membrane caps which were screwed on tightly; Group 2 was allowed to grow normally with the caps partially unscrewed; and Group 3 had regular (solid) caps which were tightly closed. The intent of group three was to simulate the effect of improper tightening of flask caps.

Flasks were gently swirled and 100 μl samples of media (containing cells) were removed from each flask at 24, 48, 72, 96, 120, 144, and 168 hours after the start of the cultures (time 0). The Trypan blue dye exclusion test was used to determine the viable and nonviable cell counts for each culture at the time points mentioned above.

The cell growth data shown in FIG. 5*a* demonstrates that the flasks with membrane caps (Group 1) were as effective for maintaining cell viability as the open caps (Group 2), while the cultures with the closed caps (Group 3) did not exhibit normal growth. Media in Group 3 flasks became purple (indicating a high pH) resulting from improper gas exchange with the incubator environment. The cultures received no fresh media during the experiment, and at 144 hours there was noticeable cell death, as demonstrated by FIG. 5b, for Groups 1 and 2. Since cells in Group 3 never thrived, they had low counts for cell death. The data indicates that there is no significant difference between cell growth for Groups 1 and 2.

The suitability of membrane-containing flask and roller bottle caps for use in growing adherent tissue cultures was also tested using the following experimental procedure. HT-29 human colon adenocarcinoma cells were cultured in McCoy's medium (GIBCO, Grand Island, N.Y.) supplemented with 10% fetal bovine serum, 110 $\mu$g per ml sodium pyruvate, and antibiotics (as described for the mouse myeloma cells). Stock cultures were grown in 100×20 mm petri dishes (Corning, Corning, N.Y.) using 10 ml of media, and were fed twice weekly by exchanging 10 ml of spent media with 10 ml of fresh media. When cultures became confluent, they were washed with PBS to remove dead cells and debris, then subcultured. 5 ml of 0.25% trypsin solution in PBS (GIBCO) was added to each dish and incubated at room temperature for three minutes. Cells were then scraped from the plates using a sterile rubber policeman, and centrifuged for 10 min. at 1000 X g. Cells were resuspended in 10 ml of McCoy's media and passed through a 25 gauge needle to disperse the clumps, then subcultivated at a ratio of 1:3.

Cells from three petri dishes were washed with PBS, trypsinized, and counted using the Trypan blue dye exclusion test. There were $2.95 \times 10^7$ live cells total and $5.1 \times 10^6$ dead cells total. Live HT-29 cells (800,000) were placed in each of 21 T-75 flasks along with 10 ml of McCoy's media. Four sterile round glass cover slips 12 mm in diameter were dropped into each flask and allowed to settle randomly in the bottom of the flask. The flasks were then divided into three groups of seven each: Group 1 had membrane caps which were screwed on tight; Group 2 had caps which were opened slightly to allow gas exchange with the environment; Group 3 had caps which were screwed on tightly to prevent gas exchange with the environment. The flasks were then placed in the incubator (at time 0) at 37° C. under 90% humidity and 5.0% $CO_2$.

The flasks were removed from the incubator after 24 hours of incubation. Eight milliliters of spent media was replaced with 8 mls of fresh media to remove most of the cells which did not attach. One flask from each of the three groups was kept for staining, and the rest of the flasks were returned to the incubator. Additionally, one flask from each group was removed from the incubator at 48, 72, 96, 120, and 144 hours to stain the cells attached to the cover slips.

For staining, all of the media was pipetted out of the flasks. The tops (i.e. the widest portion) of the flasks were then removed using a soldering gun (Weller model 8200PK). The round cover slips with attached cells were allowed to air dry in the flasks for one hour. The cells were stained directly in the flasks by adding five ml of Wright's stain (0.1 g Wright's stain dissolved in 60 ml absolute methanol) to the flask for one min. followed by five ml of distilled water for two to three min. The Wright's stain was then rinsed off and the cover slips were allowed to air dry overnight. The next day the four cover slips were removed from each of the three flasks and mounted onto 3"×1" glass slides using Permount (Sigma Chemical Co., St. Louis, Mo.) mounting media to provide a permanent record of the experiment.

One flask each of the three types of caps was removed from culture at each time point. For each time point four fields were counted per flask (one field per cover slip). The cells were counted using a 1 mm grid under 200 X magnification. The number of colonies as well as the number of cells per colony were counted.

Figure 6A:
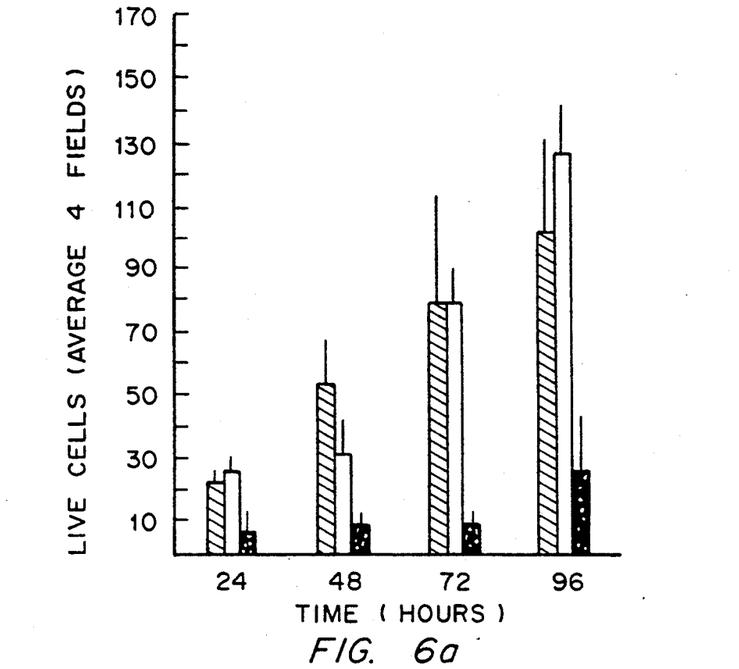
FIG. 6a plots cells cultured using caps incorporating gas permeable non-porous membranes ([\\\]); loosened caps ([]); and caps screwed on tightly (■), at 24 h, 48 h, 72 h, and 96 h.

Live cell count was plotted against time in histogram form in FIG. 6a using the following experimental procedure. HT-29 human colon adenocarcinoma cells were cultured in McCoy's medium (Gibco, Grand Island, N.Y.) supplemented with 10% fetal bovine serum, 110 micrograms per ml sodium pyruvate, and antibiotics (as described for the mouse myeloma cells). Stock cultures were grown in 100×20 mm petri dishes (Corning, Corning, N.Y.) using 10 ml of media, and were fed twice weekly by exchanging 10 ml of spent media with 10 ml of fresh media. When cultures became confluent, they were washed with PBS to remove dead cells and debris, then subcultured. 5 ml of 0.25% trypsin solution in PBS (Gibco) was added to each dish and incubated at room temperature for three minutes. Cells were then scraped from the plates using a sterile rubber policeman, and centrifuged for 10 min. at 1000 X g. Cells were resuspended in 10 ml of McCoy's media and passed through a 25 gauge needle to disperse the clumps, then subcultivated at a ratio of 1:3 cells to media.

Cells were examined for viability and counted as described above. Live cell count was plotted against time in histogram form in FIG. 6a. As with the suspension cultures, the cell growth data shows that the flasks with the membrane caps (Group 1) were as effective for maintaining cell viability as the open caps (Group 2), while the cultures with the closed caps (Group 3) did not exhibit normal growth. The cells in group three did not adhere with high efficiency to the bottom of the flasks, and thus these cells experienced a long lag period and a relatively retarded growth rate. Again, there was no significant difference between cell growth for Groups 1 and 2.

While there is no significant difference in cell growth yield for these particular cell lines, it is apparent that there will be increased yields for other cell lines that are more sensitive to changes in oxygen, carbon dioxide and pH.

Figure 6B:
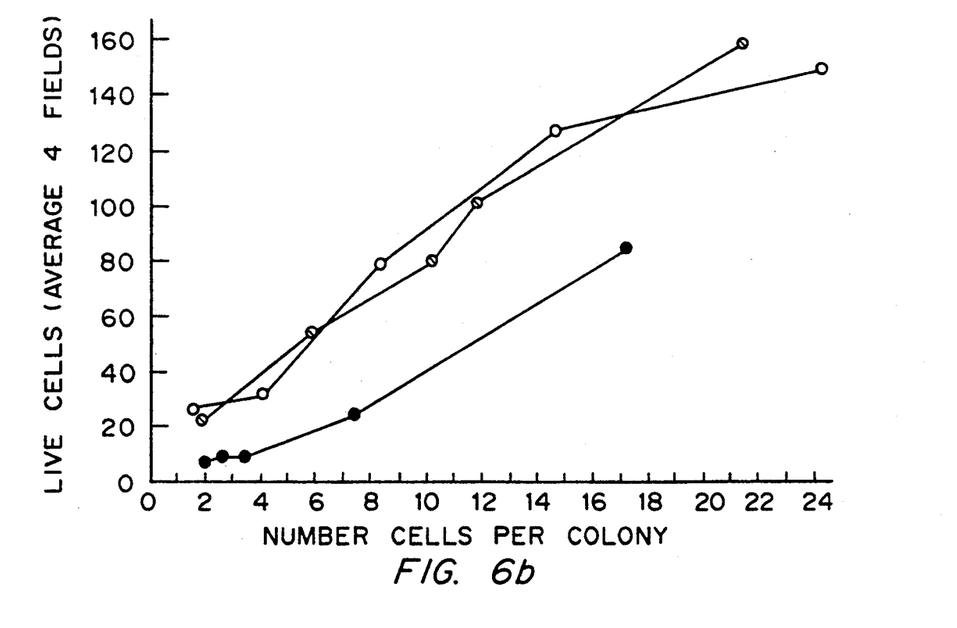
FIG. 6b plots the average number of live cells per colony against the number of live cells at 24 h, 48 h, 72 h, 96 h, and 144 h for cells cultured using caps incorporating gas permeable ultra-thin dense skin membranes (-φ-); loosened caps (-○-); and caps screwed on tightly (●).

The number of live cells (an average of four fields) was plotted against the average number of cells per colony in FIG. 6b. The data in this graph indicate that not only did the cells in Group 3 flasks not attach as efficiently as the cells grown in the other flasks, but that also the cells which did attach did not divide as rapidly. There was not statistical difference between the growth curves obtained for Groups 1 and 2.

The data in both cases demonstrate the usefulness and advantages of the novel membranes employed as apparatus for cell culture. Large scale testing has also been conducted in roller bottles. Increased cell yield and production was observed using the membranes of the present invention.

Modifications and variations of the methods and membrane-containing products of the present invention will be obvious to those skilled in the art from the foregoing detailed description of the invention. Such modifications and variations are intended to come within the scope of the appended claims.

We claim:

1. A method for making an ultra-thin dense skin gas-controlling membrane comprising the steps of:
   a) feeding porous substrate material to a polymer solution tray containing a solution of a hydrophobic polymer overlaid with a non-polymer solvent having a density less than the polymer solution, wherein the substrate is submerged in polymer solution, to produce a polymer solution-saturated substrate;
   b) floating the polymer solution-saturated substrate on the surface of the non-polymer solvent until polymer is spread evenly throughout the interstices of the substrate material while concurrently evaporating the solvent from the polymer solution to form an ultra-thin dense base skin asymmetric membrane permeable to gases and impermeable to liquids and bacteria and viruses;
   c) removing the ultra-thin dense skin membrane from the non-polymer solvent; and
   d) drying the membrane to remove the remaining solvent.

2. The method of claim 1 wherein the porous substrate material is selected from the group consisting of natural polymers, synthetic polymers and metals.

3. The method of claim 2 wherein the porous substrate material is a polymer selected from the group consisting of polyesters, polyolefins, polyamides, polycarbonates, polysulfones, polytetrafluoroethylene and combinations thereof.

4. The method of claim 1 wherein the polymer is selected from the group consisting of linear and cross-linked polydimethylsiloxanes, polydimethylsiloxanes wherein phenyl, vinyl, trifluropropyl, silanol or hydrogen is substituted for methyl, polydimethylsiloxane bisphenol A polycarbonate block co-polymers, polydimethylsiloxane polysulfone block co-polymers, and poly [1-trimethylsilyl)-1-propyne].

5. The method of claim 4 wherein the polymer-solvent solution is poly(dimethylsiloxane-co-bisphenol A polycarbonate) dissolved in dichloromethane in the range of approximately 0.005 to 0.20 grams polymer to milliliters solvent.

6. The method of claim 1 wherein the solvent is selected from the group consisting of, methylene chloride, chloroform, carbon tetrachloride, halogenated ethanes, tetrachloroethylene, and polyhalogenated propanes, having densities greater than 1.0.

7. The method of claim 1 wherein the polymer-solvent solution has a density greater than 1.0 and is overlaid with water to prevent evaporation.

8. The method of claim 1 wherein the polymer solution-saturated substrate is drawn across the surface of the non-polymer solvent at a rate of approximately 10 to 100 cm per minute.

* * * * *